(12) United States Patent
Demerath et al.

(10) Patent No.: US 6,533,655 B2
(45) Date of Patent: Mar. 18, 2003

(54) AIR VENT FOR VENTILATION SYSTEMS

(75) Inventors: Michael Demerath, Hüffler (DE); Norbert Klein, Weilerbach (DE)

(73) Assignee: TRW Automotive Electronics & Components GmbH & Co. KG, Enkenbach-Alsenborn (DE)

( * ) Notice: Subject to any disclaimer, the term of this patent is extended or adjusted under 35 U.S.C. 154(b) by 0 days.

(21) Appl. No.: 09/992,228

(22) Filed: Nov. 19, 2001

(65) Prior Publication Data

US 2002/0081965 A1 Jun. 27, 2002

(30) Foreign Application Priority Data

Nov. 20, 2000 (DE) .......................... 100 57 421

(51) Int. Cl.⁷ ................................. B60H 1/34
(52) U.S. Cl. ...................... 454/155; 454/315; 454/322
(58) Field of Search ................. 454/155, 202, 454/315, 322, 325, 326, 327, 333, 335, 336

(56) References Cited

U.S. PATENT DOCUMENTS 2,311,195 A * 2/1943 Young ........................ 49/343
3,420,448 A * 1/1969 Snow .......................... 239/569
RE28,492 E * 7/1975 Hedrick et al.
6,142,867 A * 11/2000 Lee et al. .................... 454/326

FOREIGN PATENT DOCUMENTS

| DE | 2307439 | | 9/1973 | |
| DE | 19701499 C1 | | 12/1997 | |
| DE | 19910774 A1 | | 9/2000 | |
| EP | 088916 A2 | | 1/1999 | |
| FR | 1101882 | * | 10/1955 | ................. 454/322 |
| GB | 140505 | * | 4/1949 | ................. 454/322 |
| JP | 60-169043 | * | 9/1985 | ................. 454/155 |

* cited by examiner

Primary Examiner—Harold Joyce
(74) Attorney, Agent, or Firm—Tarolli, Sundheim, Covell & Tummino L.L.P.

(57) ABSTRACT

An air escape for ventilation systems in vehicles comprises manual adjusting means for as outflow direction and for an outflow volume. The manual adjusting means have a single operating element that is movable in translation and in rotation about an axis, translational movement of the operating element causing a change the outflow direction and rotational movement causing a change of the volume flow. The operating element is connected by a cardan shaft (24) to an actuating drive that converts rotational movement of the cardan shaft into an adjustment movement of an air flap.

12 Claims, 5 Drawing Sheets

AIR VENT FOR VENTILATION SYSTEMS

FIELD OF THE INVENTION

The invention relates to an air escape device for ventilation systems in vehicles, comprising manual adjusting means for an outflow direction and for an outflow volume.

BACKGROUND OF THE INVENTION

Such air vents are used in vehicles in order to allow a controlled ventilation of the vehicle interior. Normally, the vehicle occupant can manually adjust the direction and the strength of the airflow by means of operating elements.

An adjustment of the ventilation with just one operating element is known, for example, from EP 0,888,916 A2. Here, a wheel simultaneously opens an airflow flap and affects the position of vanes that direct the airflow into the interior of the vehicle. The volume flow is not adjustable independently of the direction in which the air enters the interior of the vehicle.

BRIEF SUMMARY OF THE INVENTION

The invention provides an air escape wherein a single operating element can adjust the volume flow as well as the direction of the emerging airflow, independently of each other.

In the air escape according to the invention, the manual adjusting means have an single operating element movable in translation and in rotation about an axis, translational movement of the operating element causing a change of the outflow direction and rotational movement causing a change of the outlfow volume, and the operating element is connected by a cardan shaft to an actuating drive that converts rotational movement of the cardan shaft into an adjustment movement of an air flap. A translational movement and a rotational movement by an operating element can be carried out independently of each other with just one hand, which enhances the ergonomic convenience, and these movements are easy to convert into a movement involving various components. While, for example, vanes that influence the direction of the airflow can be moved by the translational movement of the operating element, the extent to which an air flap is open can be changed by the rotational movement of the operating element, which is converted into an adjustment movement in order to regulate the volume flow.

In a preferred embodiment of the invention, the linear movement is converted into a pivoting movement of the air flap by means of a lever connected to the air flap. In this manner, a simple conversion of the rotational movement into an opening movement of an air flap can be achieved.

In a preferred embodiment of the invention, the actuating drive comprises a threaded spindle and a nut engaged with it, the nut being mounted such that it cannot be rotated or axially displaced, and the threaded spindle is arranged with respect to the nut such that it can be rotated and axially displaced. The length compensation needed in this case along the cardan shaft is preferably achieved in that the threaded spindle consists of an inner part and an outer part, the inner and outer parts being coupled for joint rotation and so as to be axially displaceable with respect to each other. With such a mechanism, a rotational movement can easily and reliably be converted into a translational movement.

Advantageously, the operating element is coupled to the actuating drive so as to have a slight axial play, in order to allow a limited translational movement of the operating element.

Additional features and advantages of the invention ensue from the subordinate claims.

BRIEF SUMMARY OF THE DRAWINGS

The invention is described in greater detail below on the basis of several embodiments and making reference to the appended drawings. The following is shown in the drawings.

DETAILED DESCRIPTION OF THE INVENTION

Figure 1:
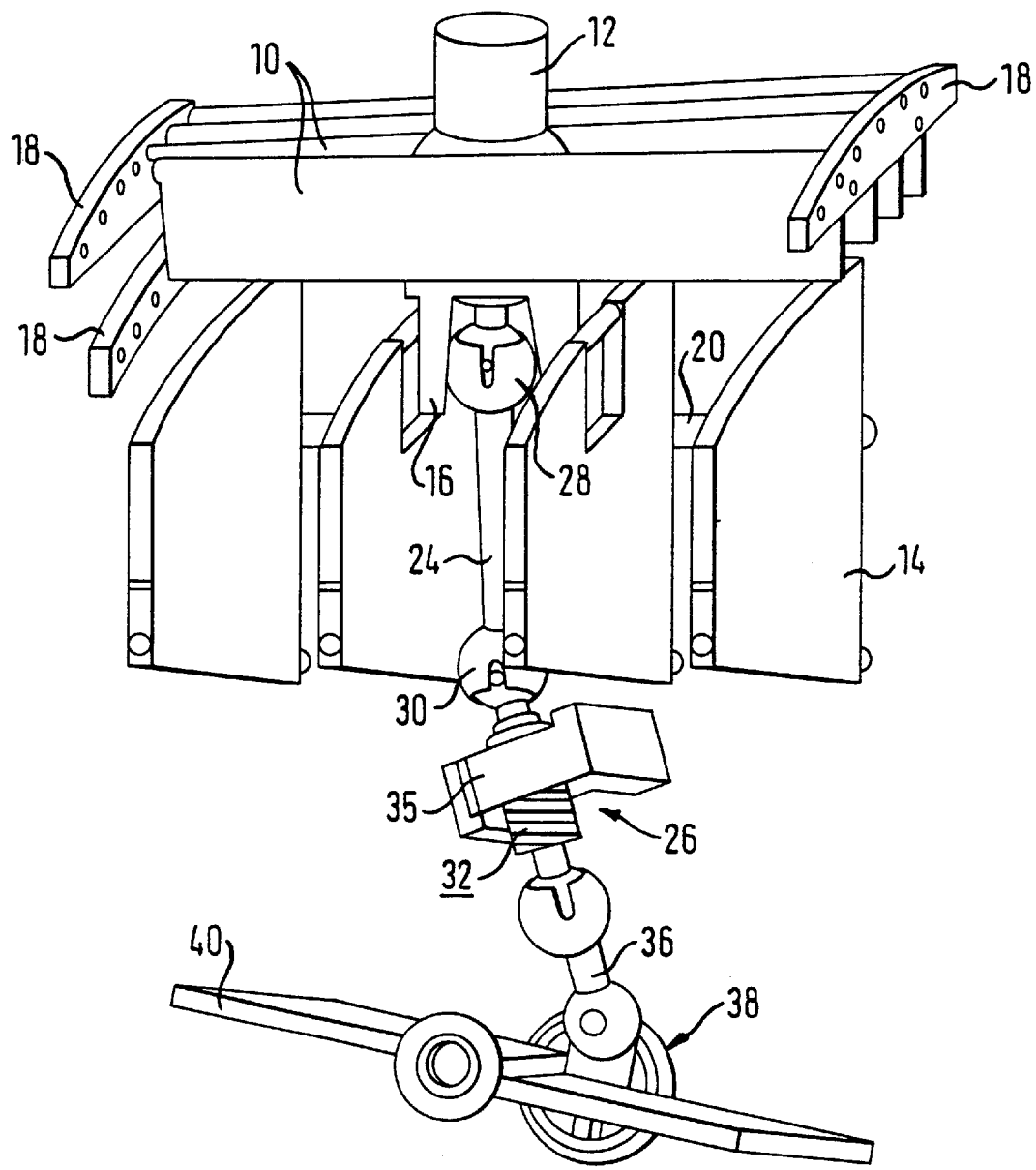
FIG. 1—a schematic three-dimensional view of part of an air escape according to the invention in a first embodiment.
Figure 2:
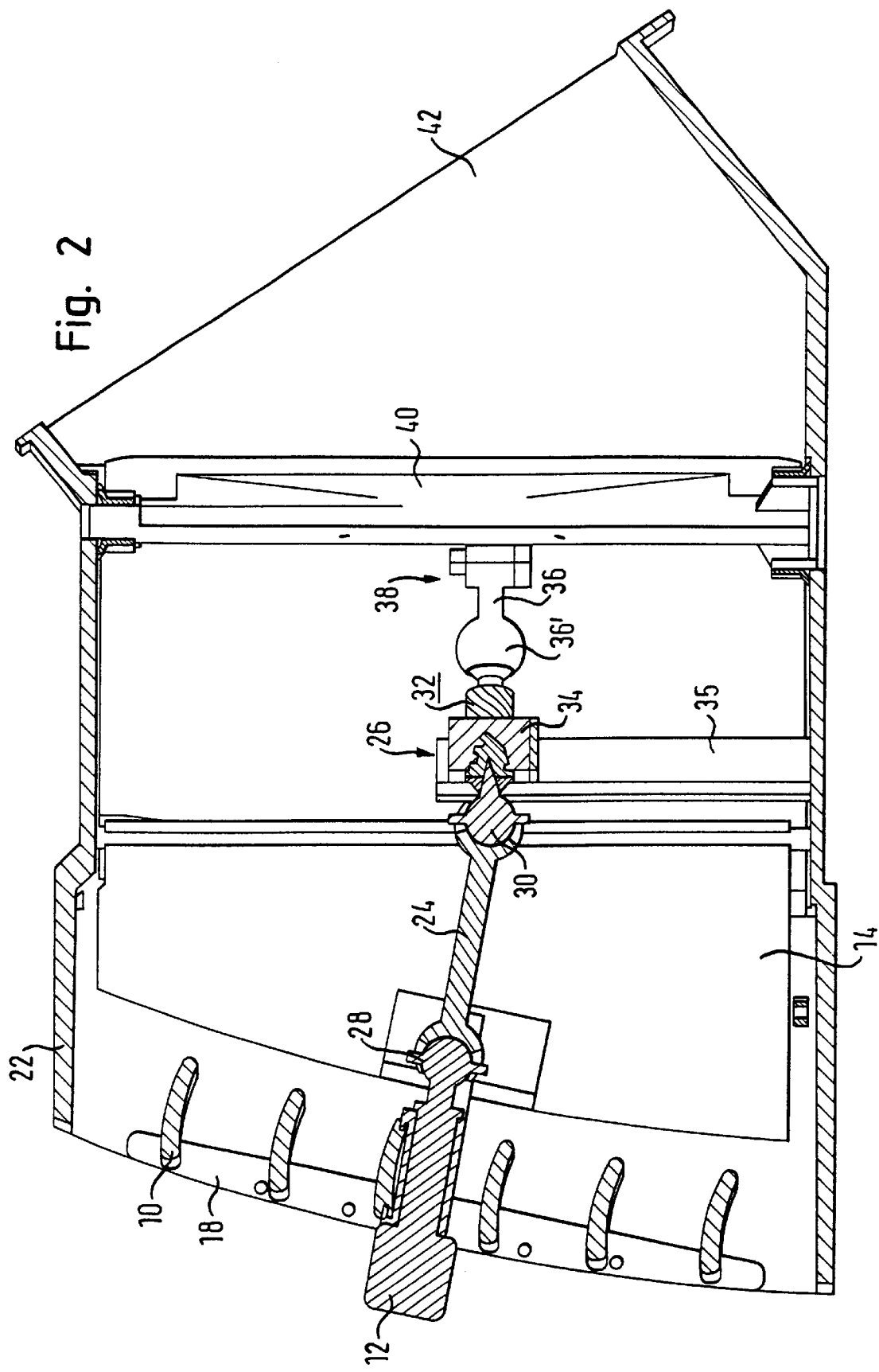
FIG. 2—a cross section through an air escape according to the invention in a first embodiment.

FIG. 1 shows the manual adjusting means of an air escape according to the invention in a first embodiment of the invention. The manual adjusting means has a first set of air guiding vanes 10 arranged in parallel to each other. Upstream from the first set of air guiding vanes 10 is a second set of air guiding vanes 14, the air guiding vanes 14 being perpendicular to the air guiding vanes 10.

In a known manner, the vanes of the first and second set are connected to each other via carriers 18, 20 so that every movement of a vane brings about a parallel movement of all of the vanes of that particular set. These carriers 18, 20 can be connected to a housing 22 (not shown in FIG. 1). The housing 22 can be attached to the vehicle.

An operating element 12 is connected to at least one vane 10 of this first set. In this case, the operating element is configured as an operating knob. The operating knob 12 is also connected to a fork-shaped component 16 that is in contact with two vanes 14 of the second set.

The operating knob 12 is connected to the vane 10 of the first set in such a way that it can be displaced in the lengthwise direction of this vane but, in the direction perpendicular thereto, said knob is coupled to said vane in a form-fitting manner. Moreover, the operating knob 12 is arranged so as to rotate around its lengthwise axis.

A tilting movement of the operating knob 12 directly causes a change in the angle of the vanes 10 of the first set, while a translational movement of the operating knob 12 is transmitted via the fork-shaped component 16 to the vanes 14 of the second set, bringing about a change in their setting angle.

Furthermore, the operating knob 12 is connected to a cardan shaft 24 that transmits a rotational movement of the operating knob 12 to an actuating drive 26. The cardan shaft 24 is configured in such a way that the operating knob 12 has a certain amount of axial play, so that it can execute limited translational compensation movements during its tilting movements.

A first joint 28 of the cardan shaft 24 is arranged between two vanes 14 of the second set in a recess of the fork-shaped component 16. A second joint 30 transmits the rotational movement to the actuating drive 26.

Figure 3:
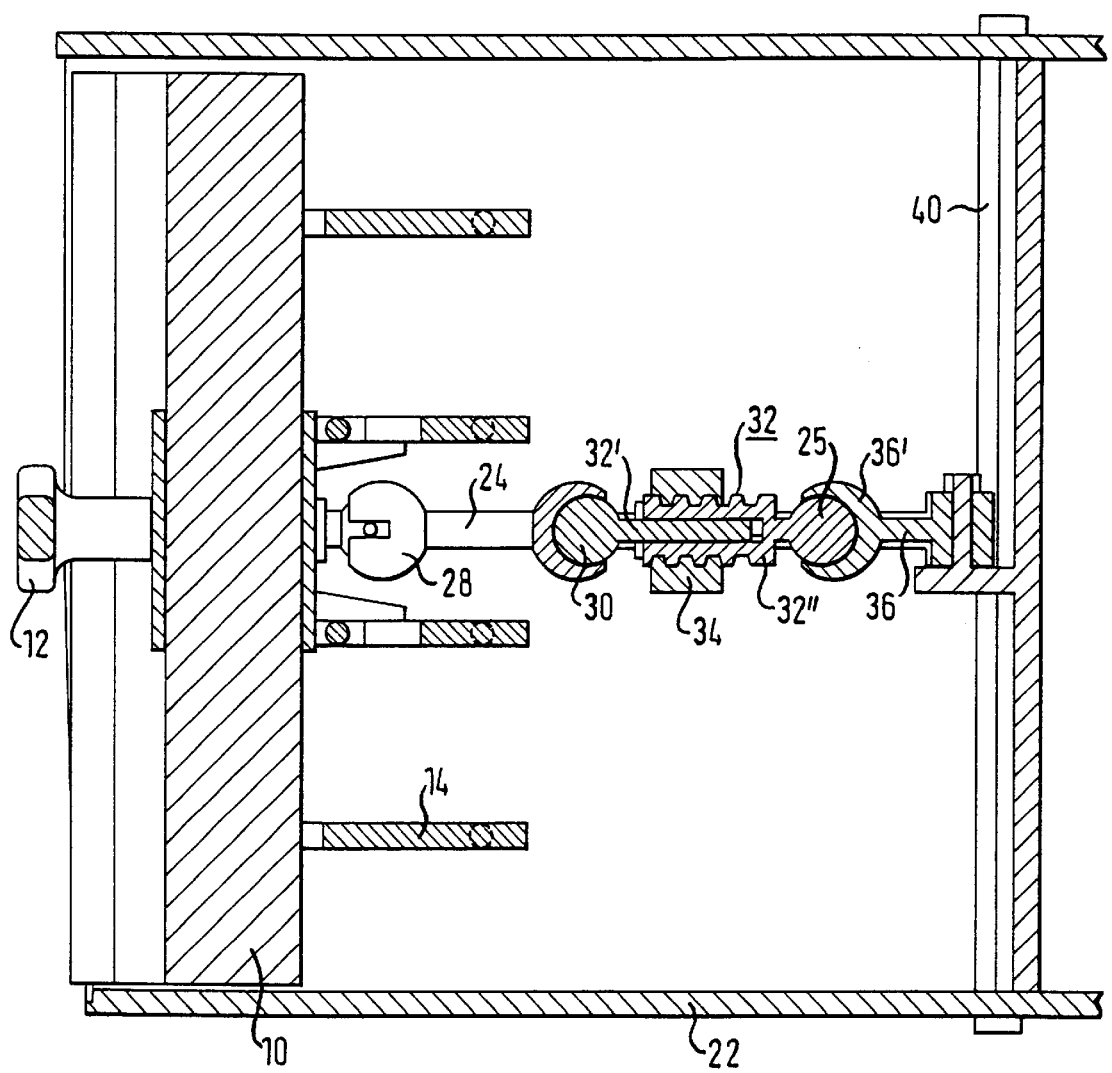
FIG. 3—another cross section through an air escape according to the invention in a first embodiment.

The actuating drive 26 (see FIG. 3) comprises a nut 34 as well as threaded spindle 32 engaged with it. The nut 34 is firmly connected to a housing-mounted component 35. The threaded spindle 32 consists of an inner part 32' and an outer part 32" which are connected in such a way that they cannot be rotated, but can be displaced axially with respect to each other. The inner part 32' concurrently forms the inner part of the joint 30. The outer part 32" of the threaded spindle 32 is connected on the end 25 facing away from the cardan shaft 24 with a joint 36' of another cardan shaft 36 in such a way that the end 25 can rotate freely in the joint 36'. The cardan shaft 36 is connected by a lever mechanism 38 with an airflow flap 40. This airflow flap 40 is arranged in a ventilation duct 42 in such a way that it can completely close it.

A rotational movement of the operating knob 12 is transmitted via the cardan shaft 24 to the actuating drive 26, whereby a rotation of the joint 30 brings about a rotation of the inner part 32' of the threaded spindle 32 and in this manner, a rotation of the outer apart 32". The result is a translational movement of the outer part 32" with respect to the nut 34 in the axial direction. The necessary length compensation is achieved by an axial displacement of the inner part 32' relative to the outer part 32".

The translational movement of the outer part 32" is transmitted via the cardan shaft 36 to the lever mechanism 38, which results in a rotation of the airflow flap 40.

The necessary length compensation can also be achieved by components in the cardan shaft 24 that can be displaced relative to each other.

Therefore, the direction of the airflow is adjusted by changing the setting angle of the vanes 10 of the first set and/or by pivoting the vanes 14 of the second set by means of a corresponding movement of the operating knob 12, which is transmitted directly to the vanes 10 of the first set and, via the component 16, to the vanes 14 of the second set, whereas the air volume flow is adjusted by a rotation of the operating knob, which is converted into a movement of an air flap.

Figure 4:
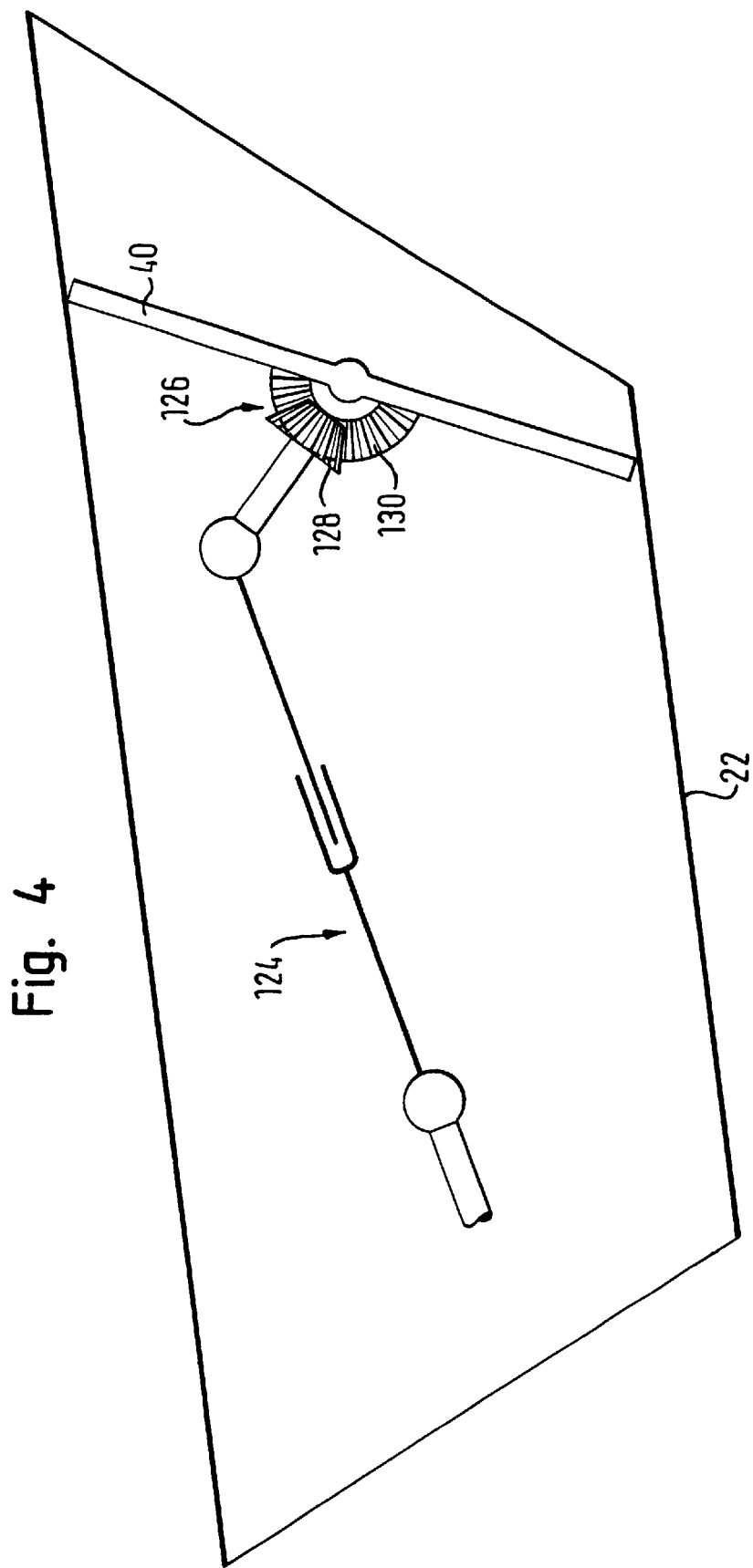
FIG. 4—a schematic drawing of an actuating drive for an air escape according to the invention in a second embodiment.

A second embodiment of the invention is shown in FIG. 4. This embodiment differs from the first embodiment in that the rotational movement of the operating element is converted into an adjustment movement of the airflow flap 40 by a bevel gear 126 that is connected via a cardan shaft 124 to the operating knob. The cardan shaft 124 is connected to a first conical gear wheel 128 of the bevel gear 126, which engages with a second conical gear wheel 130 situated on the airflow flap 40. A rotation of the operating knob is converted into a rotational movement of the shaft 124 which, in turn, brings about a rotation of the conical gear wheel 128, as a result of which the conical gear wheel 130 is made to move and the setting angle of the flap 40 is changed.

Any length compensation that might be necessary can be achieved by means of components of the cardan shaft 124 that can move axially relative to each other.

Figure 5:
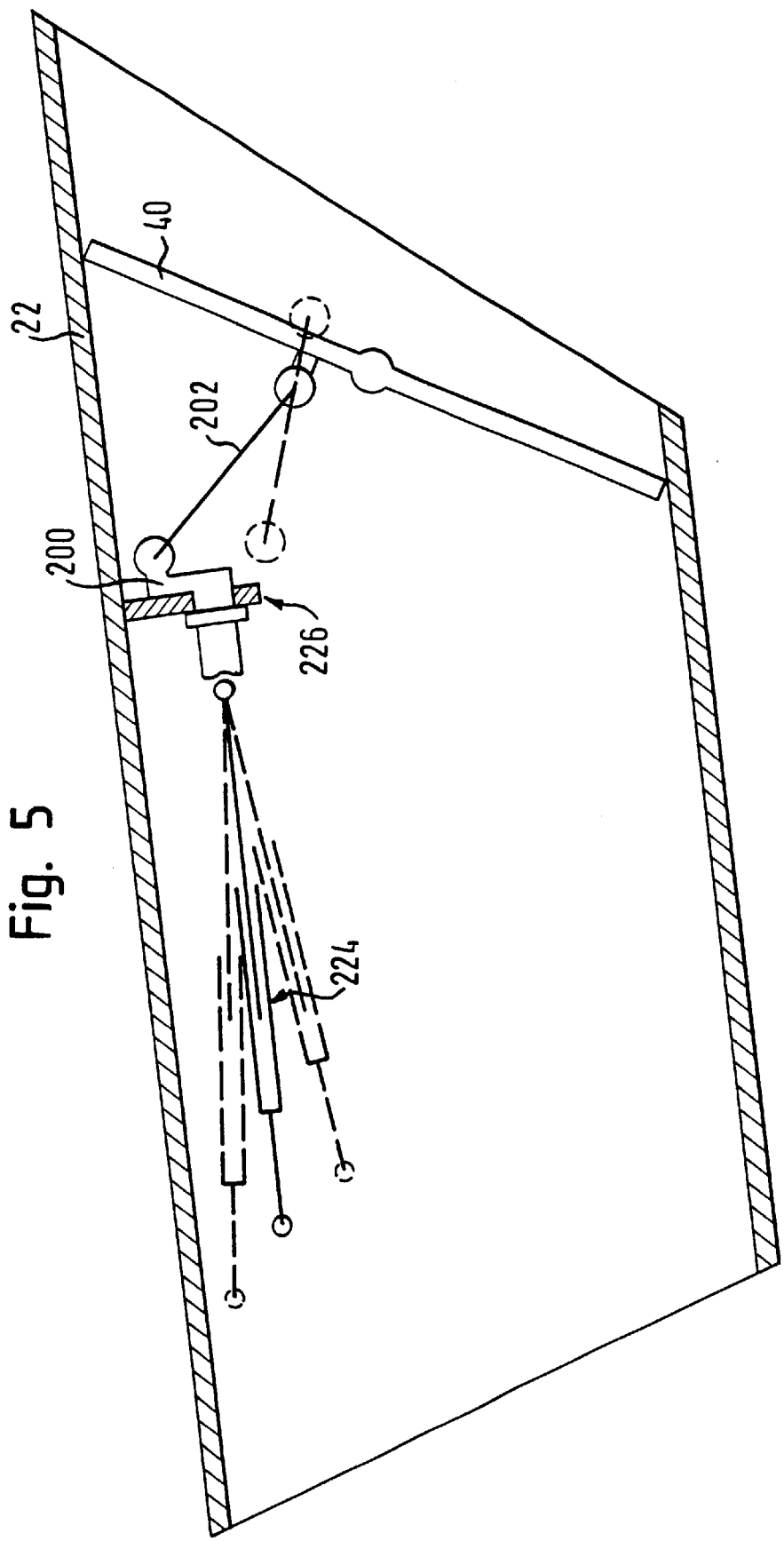
FIG. 5—a schematic drawing of an actuating drive for an air escape according to the invention in a third embodiment.

In a third embodiment of the invention shown in FIG. 5, the rotational movement is converted into an adjustment of the airflow flap 40 by means of an actuating drive mechanism 226 connected to a cardan shaft 224, said actuating drive mechanism 226 having a lever 200 with an angled end that is attached to the housing 22 so that it can be rotated but cannot be displaced, and it is attached to the airflow flap 40 by a rigid connecting member 202. The connecting member 202 is eccentrically attached to the airflow flap 40.

A rotation of the operating knob is transmitted to the lever 200 via the cardan shaft 224. The actuating drive mechanism 226 is configured in such a way that, when the angled end of the lever 200 executes a rotational movement, the distance of the angled end of the lever that serves to attach the connecting member 202 to the airflow flap 40 changes (shown by a broken line in FIG. 5). As a result of the eccentric arrangement of the connecting member 202 on the airflow flap 40, such a change in distance brings about a change in the setting angle of the flap.

The cardan shaft 224 can have a certain amount of play perpendicular to its lengthwise axis as is indicated in FIG. 5 by broken lines.

What is claimed is:

1. An air escape device for ventilation systems in vehicles, comprising manual adjusting means for an outflow direction and for an outflow volume, said adjusting means having a single operating element movable in translation and in rotation about an axis, translational movement of said operating element causing a change of the outflow direction and rotational movement causing a change of the outflow volume, and said operating element being connected by a cardan shaft to an actuating drive, said actuating drive being connected to an air flap and converting rotational movement of said cardan shaft into an adjustment movement of said air flap.

2. The air escape according to claim 1, wherein said actuating drive converts the rotational movement of said cardan shaft into a linear movement.

3. The air escape according to claim 2, wherein the linear movement is converted into a pivoting movement of said air flap by means of a lever connected to said air flap.

4. The air escape according to claim 2, wherein said actuating drive comprises a threaded spindle and a nut engaged with said spindle.

5. The air escape according to claim 4, wherein said nut is mounted such that it cannot be rotated or axially displaced, and said threaded spindle is arranged with respect to said nut such that it can be rotated and axially displaced.

6. The air escape according to claim 4, wherein said threaded spindle comprises two parts with an inner part and an outer part that are coupled for joint rotation and so as to be axially displaceable with respect to each other.

7. The air escape according to claim 1, wherein two consecutive sets of pivoting air guiding vanes are arranged in parallel in each set, said air guiding vanes of the first set being perpendicular to those of the second set, and said operating element being coupled to at least one air guiding vane of a first one of said two sets in such a way that it can be displaced in the longitudinal direction of this air guiding vane and is coupled thereto in a form-fitting manner in the perpendicular direction and so that it can rotate around its axis.

8. The air escape according to claim 7, wherein said operating element is connected to a component that is in contact with two adjacent vanes of a second one of the said sets, a displacement of said operating element in the longitudinal direction of said air guiding vane of the first set being converted via said component into a pivoting movement of said air guiding vanes of the second set.

9. The air escape according to claim 7, wherein a first joint of said cardan shaft and to which said operating element is connected, is arranged between said two air guiding vanes of the second set.

10. The air escape according to claim 1, wherein said operating element is coupled to said actuating drive so as to have axial play.

11. The air escape according to claim 1, wherein said actuating drive comprises two conical gear wheels that are engaged with each other.

12. The air escape according to claim 1, wherein said actuating drive comprises a rotatable lever connected to said cardan shaft as well as a connecting member connected with this lever and eccentrically attached to said airflow flap.

* * * * *